(No Model.)
R. LAMBERT.
HAME FASTENER.
No. 484,327. Patented Oct. 11, 1892.
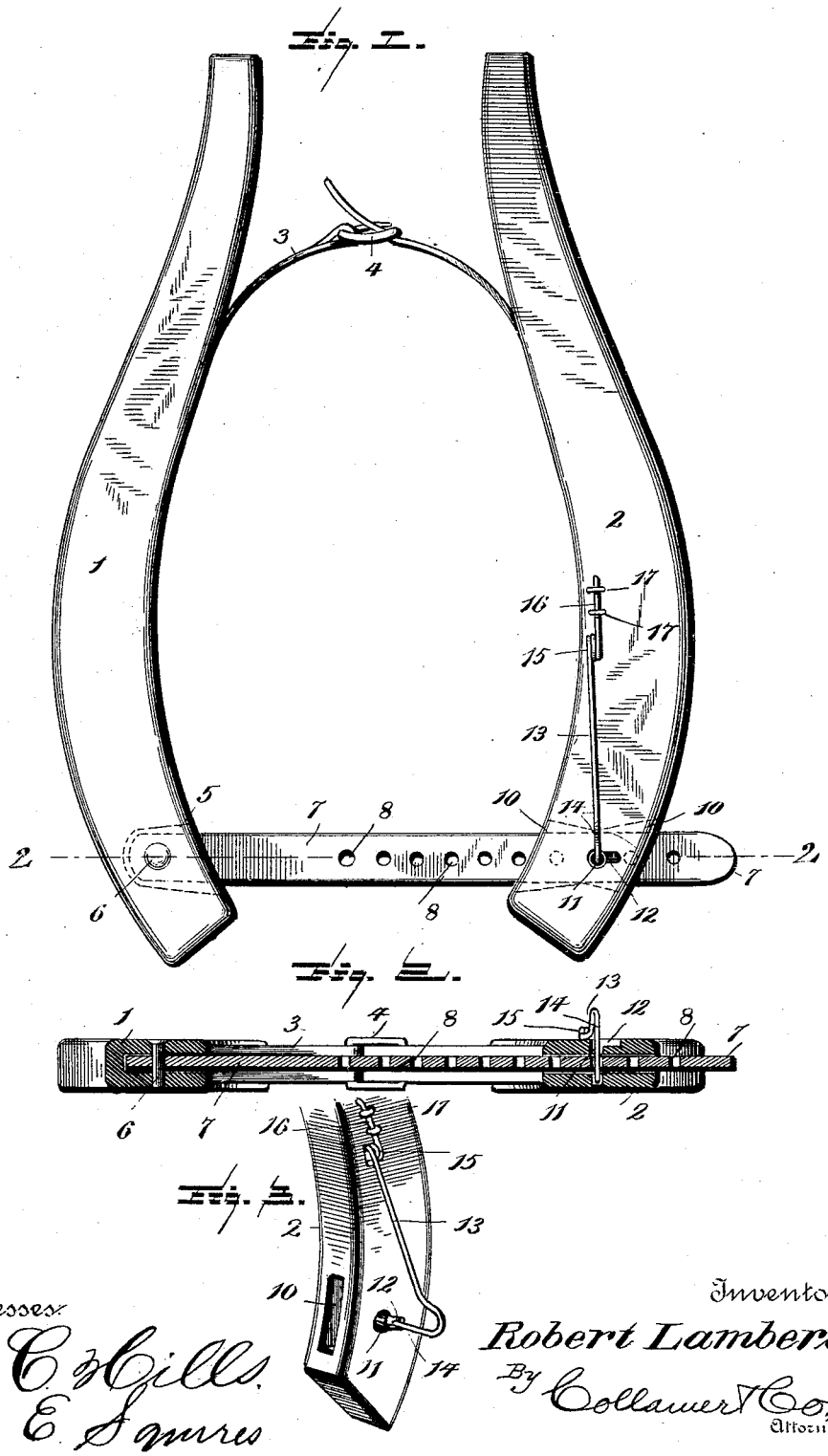
Witnesses:
L. C. Hills
D. E. Squires
Inventor:
Robert Lambert,
By Collamer & Co.,
Attorneys.

United States Patent Office.

ROBERT LAMBERT, OF FAYETTE SPRINGS, PENNSYLVANIA.

HAME-FASTENER.

SPECIFICATION forming part of Letters Patent No. 484,327, dated October 11, 1892.

Application filed June 29, 1892. Serial No. 438,351. (No model.)

*To all whom it may concern:*

Be it known that I, ROBERT LAMBERT, a citizen of the United States, residing at Fayette Springs, in the county of Fayette and State of Pennsylvania, have invented certain new and useful Improvements in Hame-Fasteners; and I do hereby declare the following to be a full, clear, and exact description of the invention, such as will enable others skilled in the art to which it appertains to make and use the same.

This invention relates to harness, and more especially to the devices known as "hame-fasteners," which are employed to detachably and adjustably connect the harness with the collar; and the object of the same is to produce certain improvements in a fastening of this character.

To this end the invention consists in the details of construction hereinafter more fully described and claimed, and as illustrated on the accompanying sheet of drawings, wherein—

Figure 1 is a front elevation of a pair of hames connected near their upper ends by an ordinary strap and buckle and at their lower ends by my improved fastening. Fig. 2 is a sectional view of Fig. 1 on the line 2 2. Fig. 3 is a perspective detail of the lower end of the left hame, showing the fastening-hook as held out of operative position.

In said drawings, 1 and 2 are respectively the right and left hames, which it will be understood are connected near their upper ends in any suitable manner, as by a strap 3, having a buckle 4. Near the lower end of the right hame is an opening 5, within which, on a horizontal pin or rivet 6, is pivoted one end of a strap 7, which may be of leather, wood, metal, or other suitable material and which has a longitudinal series of perforations 8. Near the lower end of the left hame is formed an aperture 10, and through the hame and aperture and at right angles to the latter is formed a hole 11, intersecting the aperture 10, a cavity 12 being formed in the front face of this hame in the form of an offset, communicating with one side of the front end of the hole 11.

13 is a hook whose downturned tip or extremity 14 is adapted to pass through the hole 11 and any one of the perforations 8 or may be raised and deflected laterally, so as to rest in the offset 12, as seen in Fig. 3. In order to permit this movement, the hook is connected in a yielding manner to the hame 2, and this connection is preferably made by forming a small coil 15 in the body of the hook, beyond which it is extended, as at 16, and secured by two staples 17 or otherwise to the hame.

In operation the hames are placed about the collar and supported by the strap 3, and the strap 7 is passed into and through the aperture 10 until the inner faces of the hames are brought against the collar. The tip 14 of the hook is then pushed out of the position shown in Fig. 3, when this spring will cause the tip to pass into the hole 11 and through whichever one of the perforations 8 in the strap 7 stands at that time in alignment with such hole. The hames are thereby quickly and accurately adjusted to the collar, and when it is desired to remove them the tip of the hook is raised out of engagement with the strip and reseated in the offset 12, as shown in Fig. 3.

The parts of this device are of any desired size, shape, and material, and the whole is susceptible of considerable modification without departing from the spirit of my invention. By the use of this fastening the hames can be attached to collars of various sizes, and if the strap 7 is made of rigid material the hames will not rise on the collar, even though they do not accurately fit it.

What is claimed as new is—

1. In a hame-fastener, the combination, with the hames, one of which has an opening and the other an aperture, and a hole intersecting said aperture, of a strap having a longitudinal series of perforations, the strap being pivoted at one end on a transverse pin in said opening in one hame and extending through said aperture in the other hame, and a wire hook secured at one end to the latter hame, having a spring-coil in its body, and its downturned tip being adapted to pass into said hole and through one of said perforations, as and for the purpose set forth.

2. In a hame-fastener, the combination, with the hames, one of which has an aperture, a hole intersecting said aperture, and a cavity in the face of the hame, forming a lateral offset at one extremity of said hole, of a rigid strap having a longitudinal series of perforations, the strap being pivoted to one hame and extending through said aperture in the other hame, and a spring-hook secured at one end to the latter hame, with its tip resting in said offset and adapted to pass into said hole and through one of said perforations, as and for the purpose set forth.

3. A hame-fastener consisting of a strap having a longitudinal series of perforations, the strap being pivoted to one hame and extending through an aperture in the other hame, the latter having a hole intersecting the aperture, a spring-actuated hook, its tip passing normally into said hole and normally through one of the perforations, and means, substantially as described, for holding the tip out of the hole when desired, as and for the purpose set forth.

In testimony whereof I affix my signature in presence of two witnesses.

ROBERT LAMBERT.

Witnesses:
 JAMES H. SPARKS,
 WM. SEARIGHT.